United States Patent
Rybski

(10) Patent No.: US 9,541,633 B2
(45) Date of Patent: Jan. 10, 2017

(54) SENSOR CALIBRATION SYSTEM

(71) Applicant: Caterpillar Inc., Peoria, IL (US)

(72) Inventor: Paul Edmund Rybski, Pittsburgh, PA (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 15/143,150

(22) Filed: Apr. 29, 2016

(65) Prior Publication Data

US 2016/0245899 A1 Aug. 25, 2016

(51) Int. Cl.

| | |
|---|---|
| *G01S 7/40* | (2006.01) |
| *G01S 7/497* | (2006.01) |
| *G01S 7/52* | (2006.01) |
| *G06T 7/00* | (2006.01) |
| *B64C 39/02* | (2006.01) |
| *B64F 5/00* | (2006.01) |

(52) U.S. Cl.
CPC ........... *G01S 7/4004* (2013.01); *B64C 39/024* (2013.01); *B64F 5/0045* (2013.01); *G01S 7/497* (2013.01); *G01S 7/52004* (2013.01); *G06T 7/0018* (2013.01); *B64C 2201/00* (2013.01); *G06T 2207/10032* (2013.01); *G06T 2207/30252* (2013.01)

(58) Field of Classification Search
CPC .. B64C 2201/00; B64C 39/024; B64F 5/0045; G01S 7/4004; G01S 7/497; G01S 7/52004; G06T 2207/10032; G06T 2207/30252; G06T 7/0018
USPC ............................ 701/2, 8, 33.1; 342/357.34
See application file for complete search history.

(56) References Cited

U.S. PATENT DOCUMENTS

| | | | |
|---|---|---|---|
| 6,101,455 A | 8/2000 | Davis | |
| 6,927,725 B2 | 8/2005 | Wittenberg et al. | |
| 7,218,273 B1 | 5/2007 | Webster, Jr. et al. | |
| 8,301,326 B2 | 10/2012 | Malecki et al. | |
| 2010/0076710 A1 | 3/2010 | Hukkeri et al. | |
| 2014/0163775 A1* | 6/2014 | Metzler | G01C 15/002 701/2 |
| 2014/0210663 A1* | 7/2014 | Metzler | G01C 15/00 342/357.34 |
| 2014/0267777 A1 | 9/2014 | Le Clerc et al. | |

(Continued)

FOREIGN PATENT DOCUMENTS

CN 101586943 3/2011

OTHER PUBLICATIONS

Hebei et al., Simultaneous Calibration of ALS Systems and Alignment of Multiview LiDAR Scans of Urban Areas, 2011, IEEE, p. 2364-2379.*

*Primary Examiner* — McDieunel Marc

(57) ABSTRACT

A calibration system for a machine is provided. The calibration system includes an unmanned aerial vehicle provided in association with a perception sensor. The unmanned aerial vehicle includes a target attached thereto. The unmanned aerial vehicle is configured to move along a predetermined path sweeping across a field of view of the perception sensor. The unmanned aerial vehicle is configured to present the target to the perception sensor, such that the target covers the field of view of the perception sensor based on the movement of the unmanned aerial vehicle along the predetermined path. The unmanned aerial vehicle is configured to determine and communicate an orientation and a position of the target to the calibration system.

3 Claims, 2 Drawing Sheets

(56) References Cited

U.S. PATENT DOCUMENTS

| | | | |
|---|---|---|---|
| 2014/0277854 A1* | 9/2014 | Jones | G05D 1/102 |
| | | | 701/3 |
| 2014/0306826 A1* | 10/2014 | Ricci | H04W 48/04 |
| | | | 340/573.1 |
| 2015/0269408 A1 | 9/2015 | Stark et al. | |
| 2015/0370250 A1* | 12/2015 | Bachrach | G05D 1/0016 |
| | | | 701/2 |
| 2016/0023761 A1* | 1/2016 | McNally | B64C 39/024 |
| | | | 29/407.01 |
| 2016/0158942 A1* | 6/2016 | Augenbraun | B25J 9/1694 |
| | | | 700/253 |
| 2016/0179096 A1* | 6/2016 | Bradlow | B64C 19/00 |
| | | | 701/8 |

* cited by examiner

SENSOR CALIBRATION SYSTEM

TECHNICAL FIELD

The present disclosure relates to a calibration system. More particularly, the present disclosure relates to the calibration system for a sensor mounted on a machine.

BACKGROUND

Machines include perception sensors mounted thereon. The perception sensor needs calibration prior to use. The calibration of the perception sensors is required such that relative position and orientation data recorded by the perception sensor is known with respect to a known origin on the machine. Unless this calibration of the perception sensor is conducted, location of objects around the machine cannot be resolved with respect to the location of the machine itself.

Sometimes, the perception sensor may be manually calibrated. For the manual calibration of the perception sensor, the machine is initially parked at a fixed location. A target is placed on the ground within a view of the perception sensor. Further, the perception sensor captures data associated with the target. Known calibration algorithms may then be utilized to recognize the target and return location data captured by the perception sensor. The calibration of the perception sensor may be conducted by comparing the information captured by the perception sensor and the known dimensions and location of the target. However, the manual calibration of the perception sensors is a time consuming process and may also be prone to human error. Additionally, in some situations, it may be difficult to measure an exact position of the target with respect to the machine. Other inaccuracies may include assumptions about the geometry or smoothness of the target that may not be accurately measured. These errors in the position and geometry of the target may lead to corrupt final extrinsic calibration results.

U.S. Pat. No. 6,927,725 describes a system and method for radar detection and calibration. By measuring the true range of a calibration target on entry to the radar's detection zone, the actual detection capability of the radar in current atmospheric conditions with the actual radar can be determined. The radar system is also adapted to determine a sensed position at a sensed time of a target in the radar's detection zone. A calibration target, preferably an unmanned aerial vehicle (UAV), includes a position device for determining the actual position of the calibration target. A calibration device communicates with the radar system and the calibration target and receives the sensed and actual positions of the calibration target. The calibration device calculates the error between the sensed position and the actual position and adjusts the radar system to minimize the error. The target may include a signal augmentation device to augment the radar cross-section of the target to replicate the radar cross-sections of targets of various types. In this manner the true detection range of the radar system can be determined for various types of targets under existing atmospheric conditions.

However, known automated solutions for calibration of the perception sensor may be costly and complex. Hence, there is a need for an improved automated system for the calibration of the perception sensor associated with the machine.

SUMMARY OF THE DISCLOSURE

In an aspect of the present disclosure, a calibration system for a machine is provided. The calibration system includes a perception sensor mounted on the machine. The perception sensor has a field of view. The calibration system includes an unmanned aerial vehicle provided in association with the perception sensor. The unmanned aerial vehicle includes a target attached thereto. The target has a predetermined geometry. The unmanned aerial vehicle is configured to move along a predetermined path sweeping across the field of view of the perception sensor. The unmanned aerial vehicle is configured to present the target to the perception sensor, such that the target covers the field of view of the perception sensor based on the movement of the unmanned aerial vehicle along the predetermined path. The unmanned aerial vehicle is configured to determine and communicate an orientation and a position of the target to the calibration system.

Other features and aspects of this disclosure will be apparent from the following description and the accompanying drawings.

DETAILED DESCRIPTION

Figure 1:
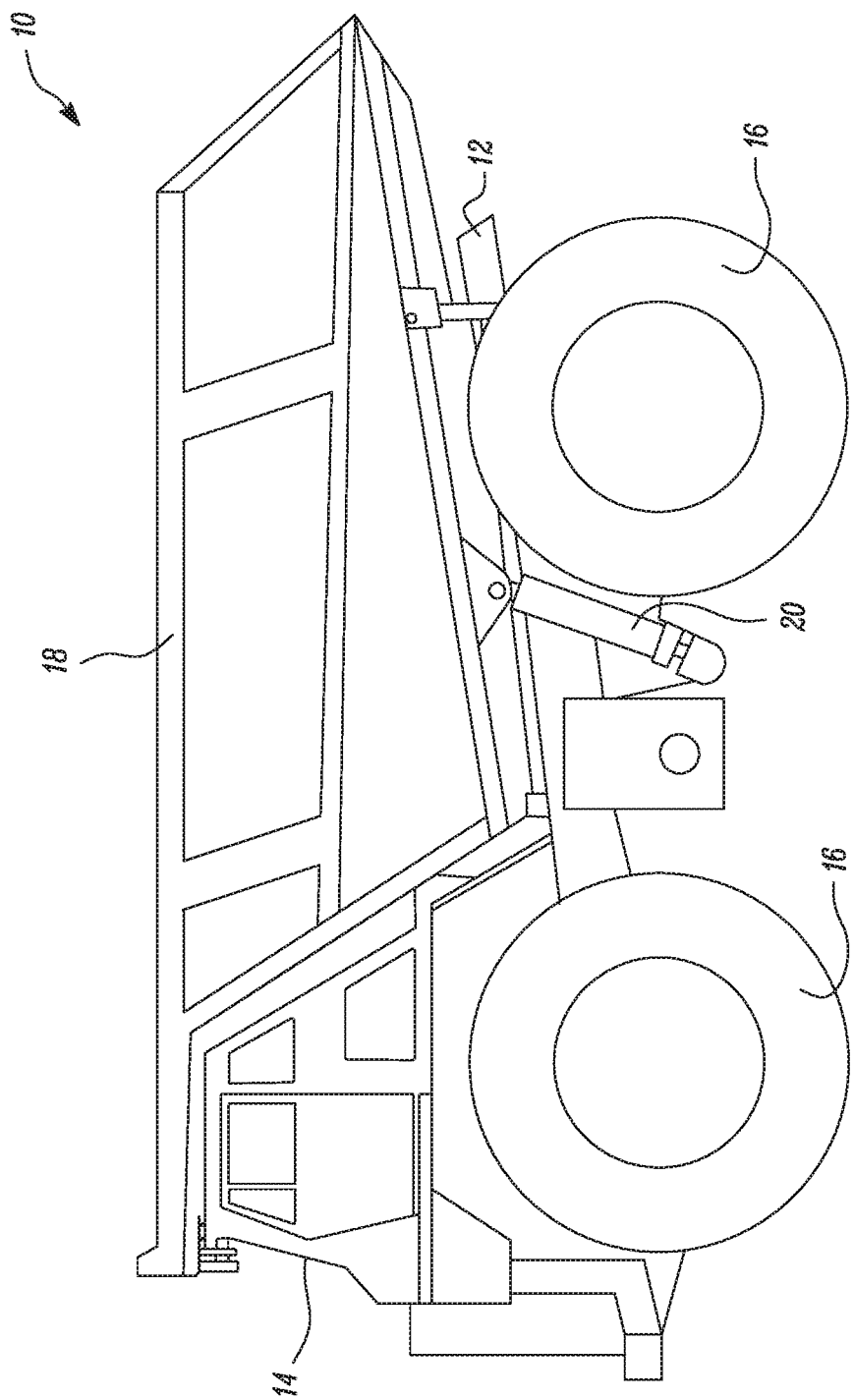
FIG. 1 is a side view of an exemplary machine, according to one embodiment of the present disclosure.

Wherever possible, the same reference numbers will be used throughout the drawings to refer to the same or the like parts. Referring to FIG. 1, an exemplary machine 10 is illustrated. More specifically, the machine 10 is an off-highway truck. The machine 10 is configured to transport material from one location to another. In other embodiments, the machine 10 may be any other machine such as a wheel loader, a dozer, a track type tractor, a truck, and so on. The machine 10 may be any machine related to an industry such as construction, agriculture, transportation, forestry, material handling, waste management, and so on.

The machine 10 includes a frame 12. The frame 12 is configured to support various components of the machine 10 thereon. The machine 10 includes an engine (not shown) mounted on the frame 12. The engine may be any internal combustion engine powered by a fuel such as diesel, gasoline, natural gas, and so on or a combination thereof. The engine is configured to provide motive power to the machine 10.

The machine 10 includes an operator cabin 14 mounted on the frame 12. The operator cabin 14 is configured to house various controls of the machine 10 including, but not limited to, a steering, levers, pedals, joysticks, buttons, an operator interface, audio video devices, and an operator seat. The controls are configured to operate and control the machine 10 on ground. The machine 10 also includes wheels 16 mounted to the frame 12. The wheels 16 are configured to support and provide mobility to the machine 10 on ground.

The machine 10 includes a dump body 18 pivotably attached to the frame 12. Payload is filled into the dump body 18 for transportation from one location to another. The dump body 18 is pivotally coupled to the frame 12 of the machine 10. A number of actuators 20 may actuate the dump body 18 through various positions for filling or dumping of the payload therewithin. Additionally, the machine 10 may include other components and systems such as, an engine control system (not shown), a transmission system (not shown), a drive control system (not shown), a safety system (not shown), and so on without limiting the scope of the disclosure.

Figure 2:
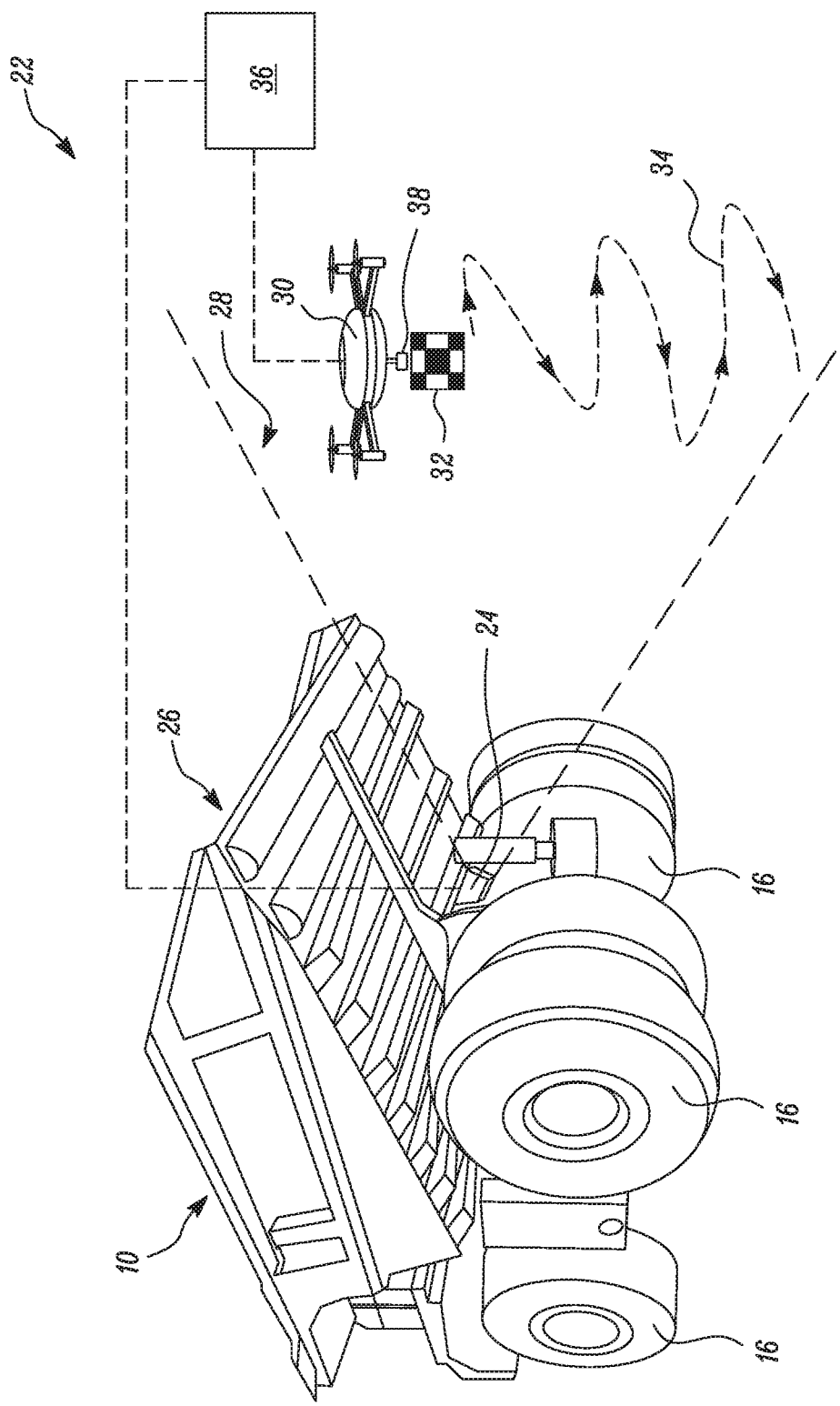
FIG. 2 is a schematic view of the rear view of the machine of FIG. 1 and the calibration system, according to one embodiment of the present disclosure.

The present disclosure relates to a calibration system 22 (see FIG. 2) associated with the machine 10. Referring to FIG. 2, the calibration system 22 includes a perception sensor 24 mounted on a rear end 26 of the machine 10. Alternatively, the perception sensor 24 may be mounted at any suitable location on the machine 10. For example, the perception sensor 24 may be mounted on a front end, left side, right side, and/or top portion of the machine 10. The perception sensor 24 is configured to generate a signal indicative of data points associated with an operating environment of the machine 10. The perception sensor 24 may include one or more systems such as a camera system, a Light Detection And Ranging (LADAR) system, a radar system, a Sound Navigation And Ranging (SONAR) system, a structured light type sensor, and so on without any limitation. The perception sensor 24 has a predefined field of view 28 such that the perception sensor 24 generates the data points for a region of the environment of a worksite falling within the field of view 28 of the perception sensor 24. The field of view 28 of the perception sensor 24 may vary based on a variety of factors including, but not limited to, range capability of the perception sensor 24 and mounting location of the perception sensor 24 on the machine 10.

Further, the calibration system 22 includes an unmanned aerial vehicle 30. The unmanned aerial vehicle 30 is provided in association with the perception sensor 24. The unmanned aerial vehicle 30 may include any rotary wing machine known in art. A target 32 is fixedly attached to the unmanned aerial vehicle 30. Geometry of the target 32 or patterns provided on the target 32 are predetermined based on the type of the perception sensor 24 which the unmanned aerial vehicle 30 is associated with. More specifically, the geometry of the target 32 may be selected based upon the calibration requirements of the perception sensor 24. In one embodiment, when the perception sensor 24 is the monocular or stereo camera system, the target 32 may include a visible target of known geometry, such as a planar board or a checkered board pattern. In another embodiment, when the perception sensor 24 is the LADAR system, the target 32 may have a known shape such that the target 32 is covered with retro-reflective material for use in intensity based measurements. In yet another embodiment, when the perception sensor 24 is the RADAR system, the target 32 may be a corner reflector target.

The unmanned aerial vehicle 30 is configured to move along a predetermined path 34 in space. The predetermined path 34 is selected such that the unmanned aerial vehicle 30 navigates the entire field of view 28 of the perception sensor 24. Accordingly, the unmanned aerial vehicle 30 may receive signals from a controller 36 located off-site. The controller 36 may command the navigation of the unmanned aerial vehicle 30 along the predetermined path 34. The predetermined path 34 may vary based on the field of view 28 and/or location of the perception sensor 24.

Additionally, a position detection module 38 may be associated with the unmanned aerial vehicle 30. The position detection module 38 is configured to generate a signal indicative of a current position and an orientation of the unmanned aerial vehicle 30 and/or the target 32 in space. In one embodiment, the position detection module 38 may include a Global Positioning System (GPS) and an Inertial Measurement Unit (IMU) to detect and communicate the position and the orientation of the unmanned aerial vehicle 30 and/or the target 32 respectively. Alternatively, any other known systems or sensors may be used to determine the position and the orientation of the unmanned aerial vehicle 30 and/or the target 32. As shown, the position detection module 38 is on-board the unmanned aerial vehicle 30. In other embodiments, the position detection module 38 may be present at a remote location. Accordingly, based on the current position of the unmanned aerial vehicle 30 and the predetermined path 34, the controller 36 may send control signals to command the movement of the unmanned aerial vehicle 30 along the predetermined path 34. The controller 36 may monitor the position and orientation of the target 32 and/or the unmanned aerial vehicle 30 as the unmanned aerial vehicle 30 navigates the field of view 28 of the perception sensor 24. This data may be stored by the controller 36 in a suitable storage device (not shown) associated therewith for further processing.

As the unmanned aerial vehicle 30 moves along the predetermined path 34, the unmanned aerial vehicle 30 presents the target 32 to the perception sensor 24 for calibration thereof. Moreover, as the unmanned aerial vehicle 30 moves along the field of view 28 of the perception sensor 24, the target 32 moves along the predetermined path 34 such that the target 32 covers the field of view 28 of the perception sensor 24. In one embodiment, the predetermined path 34 may be chosen in such a manner to allow the target 32 to move along the entire field of view 28 or some areas of the field of view 28 multiple times.

When the target 32 is presented to the perception sensor 24, the perception sensor 24 captures data associated with the target 32. For example, if the perception sensor 24 is the camera system, the data may include image data associated with the patterns provided on the target 32. Known algorithms may then be used to recognize the data associated with the target 32 and return the location of the target 32 as sensed by the perception sensor 24. Further, the perception sensor 24 captures information associated with the target 32 that is sensed by the perception sensor. In one embodiment, this information may include a sensed position and orientation of the target 32.

The controller 36 is communicably coupled to the perception sensor 24. The controller 36 may receive information associated with the target 32 that is captured and/or sensed by the perception sensor 24 as the target 32 moves along the predetermined path 34. The controller 36 may then correlate the information sensed by the perception sensor 24 with the position and orientation data of the unmanned aerial vehicle 30 and/or the target that is monitored and communicated by the position detection module 38 of the unmanned aerial vehicle 30. In one embodiment, the controller 36 may map the sensory information and the position and orientation data with a pre-stored dataset.

In other embodiments, the correlation between the sensory information and the data related to the target 32 monitored by the position detection module 38 may be obtained through any other known methods. Using known algorithms the controller 36 may then calibrate the perception sensor 24 based on the sensed information and the true co-ordinates in three dimensional space obtained from the position and the orientation of the unmanned aerial vehicle 30. It should be noted that the processing of the sensor data for generating the calibration results may be achieved using various known algorithms. More particularly, these point reconstruction algorithms may be readily used to associate two dimensional data points in the sensory data with three dimensional data points for computing the three dimensional location and orientation of the perception sensor 24 in space. For example, Perspective-n-Point (PnP) or PnP using RANSAC scheme may be utilized for this purpose. In some embodiments, the calibration of the perception sensor 24 may be conducted in an offline process after the unmanned aerial vehicle 30 has traversed the entire field view 28 of the perception sensor 24.

In one embodiment, to make the calibration system 22 more robust and minimize inaccuracies that may occur due to errors in the monitored position and the orientation of the unmanned aerial vehicle 30, an estimate of bounded errors associated with the position and the orientation of the unmanned aerial vehicle 30 may be utilized to refine the calibration process. Accordingly, the estimate of a worst case error may be identified. Further, after the point reconstruction algorithms have been performed, known algorithms such as, but not limited to, Bundle Adjustment, may be used to find the most likely or optimal solution for the position and the orientation of the perception sensor 24 in the face of the known error.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller 36. Various other circuits may be associated with the controller 36 such as power supply circuitry, signal conditioning circuitry, driver circuitry, and other types of circuitry. The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine 10. The functionality of the controller 36 may be implemented in hardware and/or software without regard to the functionality.

INDUSTRIAL APPLICABILITY

The present disclosure relates to the calibration of the perception sensor 24. The unmanned aerial vehicle 30 is programmed to traverse the entire field of view 28 of the perception sensor 24. Further, the predetermined path 34 of the unmanned aerial vehicle 30 may be selected in such a manner that the target 32 is presented to the perception sensor 24 at multiple locations in the field of view 28 of the perception sensor 24. This may help in reducing or resolving calibration errors caused by improper modeling of the sensor lens configuration or intrinsic calibration. Also, the unmanned aerial vehicle 30 may cover the entire field of view 28 of the perception sensor 24 multiple times during the movement along the predetermined path 34 such that reductant measurements may be provided to reduce errors in the calibration. The position and the orientation of the unmanned aerial vehicle 30 and thus that of the target 32 attached thereto may be accurately measured by the position detection module 38.

The calibration of the perception sensor 24 may be conducted during installation of the perception sensor 24 on the machine 10. Additionally, the calibration of the perception sensor 24 may take place whenever the orientation and/or location of the perception sensor 24 on the machine 10 is changed, for example, on impact with an external object. The calibration system 22 provides a fast and efficient way to calibrate the perception sensor 24. The calibration system 22 provides a reproducible solution that may be utilized for the calibration of a variety of types of the perception sensor 24 on the machine 10.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A calibration system for a machine, the calibration system comprising:
    a perception sensor mounted on the machine, the perception sensor having a field of view; and
    an unmanned aerial vehicle provided in association with the perception sensor, the unmanned aerial vehicle including a target attached thereto, wherein the target has a predetermined geometry, such that the unmanned aerial vehicle is configured to:
        move along a predetermined path sweeping across the field of view of the perception sensor;
        present the target to the perception sensor, such that the target covers the field of view of the perception sensor based on the movement of the unmanned aerial vehicle along the predetermined path; and
        determine and communicate an orientation and a position of the target to the calibration system.

2. The calibration system of claim 1, wherein the calibration system is configured to calibrate the perception sensor based, at least in part, on a correlation of information associated with the target sensed by the perception sensor and the position and the orientation of the target communicated by the unmanned aerial vehicle.

3. The calibration system of claim 2, wherein the information associated with the target includes the position and the orientation of the target.

* * * * *